United States Patent
Desai et al.

(10) Patent No.: US 11,684,002 B2
(45) Date of Patent: Jun. 27, 2023

(54) SWAY ADJUSTMENT APPARATUS

(71) Applicant: DEERE & COMPANY, Moline, IL (US)

(72) Inventors: Kalyani Dadasaheb Desai, Southgate, MI (US); Amol Hanmant Jagtap, Pune (IN)

(73) Assignee: DEERE & COMPANY, Moline, IL (US)

( * ) Notice: Subject to any disclaimer, the term of this patent is extended or adjusted under 35 U.S.C. 154(b) by 259 days.

(21) Appl. No.: 17/122,695

(22) Filed: Dec. 15, 2020

(65) Prior Publication Data

US 2022/0183203 A1 Jun. 16, 2022

(51) Int. Cl.
*A01B 59/04* (2006.01)
*A01B 59/041* (2006.01)

(52) U.S. Cl.
CPC .................. *A01B 59/041* (2013.01)

(58) Field of Classification Search
CPC ....... A01B 59/041; F16B 5/0275; B60D 1/30; Y10T 29/53678; Y10T 279/16; Y10T 74/18752
See application file for complete search history.

(56) References Cited

U.S. PATENT DOCUMENTS

| | | |
|---|---|---|
| 1,937,547 A | 12/1933 | Cartlidge |
| 2,935,147 A | 5/1960 | Edman et al. |
| 3,047,076 A | 7/1962 | Wier et al. |
| 3,627,060 A | 12/1971 | Lemmon |
| 3,709,304 A * | 1/1973 | Haupt ............... A01B 59/041 172/450 |
| 3,797,613 A * | 3/1974 | Nehr .................. F16D 65/562 188/79.62 |
| 3,837,677 A * | 9/1974 | Haskins .............. B60D 1/30 280/498 |
| 3,847,228 A * | 11/1974 | Slosiarek ........... A01B 59/041 172/450 |

(Continued)

FOREIGN PATENT DOCUMENTS

| | | |
|---|---|---|
| CN | 203560252 U | 4/2014 |
| DE | 1557848 A1 | 7/1972 |

(Continued)

OTHER PUBLICATIONS

German Search Report issued in application No. 102021212026.1, dated Jul. 20, 2022, 10 pages.

*Primary Examiner* — Jamie L McGowan

(57) ABSTRACT

A sway adjustment apparatus includes a casing, a fastener positioned within an interior of the casing, a first seal positioned near a first end of the casing between the fastener and the casing, a second seal positioned near a second end of the casing between the fastener and the casing, a cover positioned at a first end of the fastener, and end member positioned at a second end of the fastener. A first set of external threads on the fastener cooperate with internal threads in the casing. The first set of external threads and the internal threads are positioned between the first seal and the second seal. Rotating the fastener in a first direction extends the fastener from the casing. Rotating the fastener in a second direction retracts the fastener into the casing. The end member maintains the position of the fastener within the casing.

20 Claims, 4 Drawing Sheets

(56) References Cited

U.S. PATENT DOCUMENTS

| | | | | |
|---|---|---|---|---|
| 3,888,316 A * | 6/1975 | Azzarello | ............ | A01B 59/041 |
| | | | | 172/450 |
| 3,910,355 A | 10/1975 | Elfes et al. | | |
| 4,108,463 A | 8/1978 | Old | | |
| 4,265,464 A | 5/1981 | Lange | | |
| 4,268,057 A * | 5/1981 | Engelmann | .......... | A01B 59/041 |
| | | | | 172/450 |
| 4,601,486 A | 7/1986 | Marcq | | |
| 4,790,557 A * | 12/1988 | Klingler | ............... | A01B 59/041 |
| | | | | 172/450 |
| 5,823,268 A * | 10/1998 | Barnes | ................. | A01B 59/041 |
| | | | | 172/450 |
| 6,371,217 B1 * | 4/2002 | Boden | ................. | A01B 59/041 |
| | | | | 172/450 |
| 6,591,918 B1 * | 7/2003 | Wojewodzki | ........ | A01B 59/041 |
| | | | | 172/450 |
| 7,137,643 B1 * | 11/2006 | Hsueh | ...................... | B60D 1/30 |
| | | | | 280/455.1 |
| 7,377,330 B2 | 5/2008 | Mickelson et al. | | |
| 7,527,279 B1 * | 5/2009 | McCalip | ................ | B60D 1/143 |
| | | | | 280/460.1 |
| D814,280 S * | 4/2018 | Tarbell | .......................... | D8/387 |
| 2004/0115023 A1 * | 6/2004 | Gosling | ................ | F16B 31/043 |
| | | | | 411/14.5 |
| 2011/0156372 A1 * | 6/2011 | Harper | ..................... | B60D 1/06 |
| | | | | 280/515 |
| 2020/0158159 A1 * | 5/2020 | Sicard | ................... | F16B 37/125 |

FOREIGN PATENT DOCUMENTS

| | | |
|---|---|---|
| DE | 3512428 A1 | 10/1986 |
| FR | 2489650 A1 | 3/1982 |
| GB | 2150407 A | 7/1985 |
| WO | WO-2015156072 A1 * | 10/2015 ......... F16H 25/2204 |

\* cited by examiner

SWAY ADJUSTMENT APPARATUS

CROSS-REFERENCE TO RELATED APPLICATIONS

N/A

FIELD OF THE DISCLOSURE

The present disclosure relates to a sway adjustment apparatus for a work vehicle.

BACKGROUND

Work vehicles include hitch linkages to attach various implements. Some tractors have space constraints for these hitch linkages. A sway block type mechanism can be used to set the amount of sway with a fastener. However, these fasteners are exposed to the elements which can cause the threads to corrode or rust and can result in the inability to adjust the amount of sway.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a sway adjustment apparatus having a casing providing lubricant to threads of a fastener throughout a range of operation.

According to an aspect of the present disclosure, a sway adjustment apparatus includes a casing, a fastener, a first seal, a second seal, a cover, and an end member. The casing includes internal threads on an interior surface positioned between a first end and a second end of the casing. The fastener is positioned within an interior of the casing. The fastener includes a first set of external threads on an exterior surface, and the first set of external threads cooperates with the internal threads of the casing. The fastener rotates in a first direction to extend the fastener from the casing and to rotate in a second direction to retract the fastener into the casing. The first seal is positioned near the first end of the casing between the interior surface of the casing and the exterior surface of the fastener. The second seal is positioned near the second end of the casing between the interior surface of the casing and the exterior surface of the fastener. The cover is positioned at a first end of the fastener. The cover can be an integrated portion of the fastener or a separate member from the fastener. The end member is positioned at a second end of the fastener. The end member maintains the position of the fastener within the casing.

According to an aspect of the present disclosure, the first and second seals form a lubricant reservoir to maintain lubricant in the first set of external threads of the fastener and the internal threads of the casing.

According to an aspect of the present disclosure, a lubricant fitting is positioned within an orifice located between the first and second ends of the casing. Lubricant is added to the lubricant reservoir via the lubricant fitting.

According to an aspect of the present disclosure, the fastener includes a second set of external threads positioned on an opposite side of the second seal from the first set of external threads.

According to an aspect of the present disclosure, the fastener includes a level first surface positioned next to the first set of external threads. The first surface interacts with the first seal forming a portion of the reservoir.

According to an aspect of the present disclosure, the fastener includes a level second surface positioned between the first set of threads and the second set of threads. The second surface interacts with the second seal forming a portion of the reservoir.

According to an aspect of the present disclosure, the first surface has a larger circumference than the first set of external threads.

According to an aspect of the present disclosure, the first set of external threads has a larger circumference than the second surface.

According to an aspect of the present disclosure, the second surface has a larger circumference than the second set of external threads.

According to an aspect of the present disclosure, the casing includes a rim positioned at the first end and a channel spaced apart from the rim a first distance.

According to an aspect of the present disclosure, the cover limits an amount of retraction.

According to an aspect of the present disclosure, the end member limits an amount of extension.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The implementations disclosed in the above drawings and the following detailed description are not intended to be exhaustive or to limit the disclosure to these implementations. Rather, there are several variations and modifications which may be made without departing from the scope of the present disclosure.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps, which may be comprised of any number of hardware, software, and/or firmware components configured to perform the specified functions.

Terms of degree, such as "generally", "substantially" or "approximately" are understood by those having ordinary skill in the art to refer to reasonable ranges outside of a given value or orientation, for example, general tolerances or positional relationships associated with manufacturing, assembly, and use of the described implementations.

Figure 1:
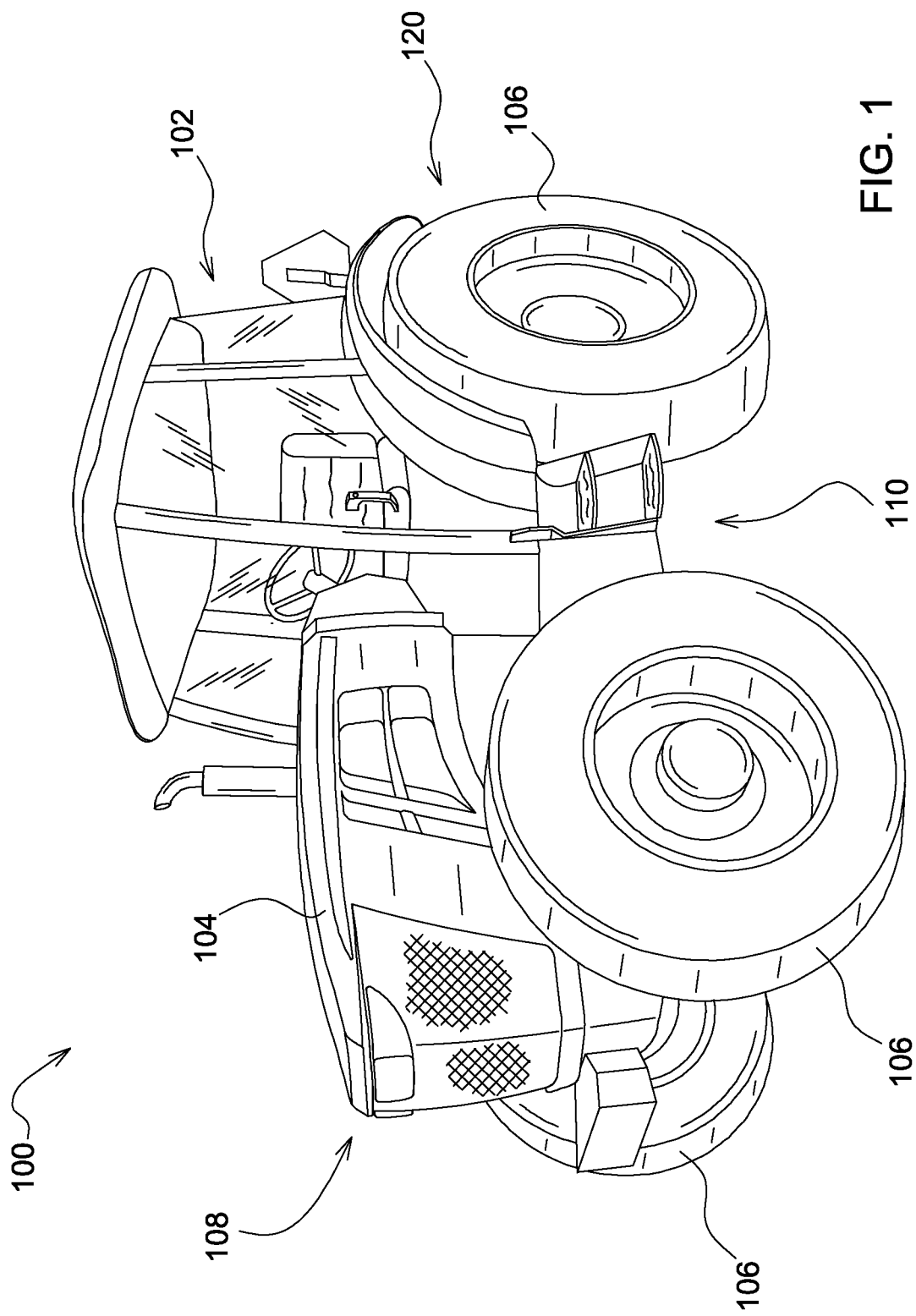
FIG. 1 is a perspective view of a work vehicle including a sway adjustment apparatus, according to an implementation.

FIG. 1 illustrates an agricultural work vehicle 100, for example an agricultural tractor. This disclosure also applies to other types of work vehicles including, but not limited to, agriculture, construction, forestry, transportation, and road building vehicles. The agricultural work vehicle 100, hereinafter referred to as a work vehicle 100, can include a frame or chassis 110, an operator station or cab 102, and one or more ground engaging apparatus 106, for example wheels or track assemblies. The work vehicle 100 can have a rigid frame 110 or an articulated frame 110. The work vehicle 100 can include a power source 108 positioned under a covering or hood 104 and a transmission transferring power to the ground engaging apparatus 106, hereinafter referred to as wheels 106, and one or more power take off shafts. The work vehicle 100 can include an operator interface having any number and combination of electronic devices, such as an interactive display. The work vehicle 100 can include a sway adjustment apparatus 120.

Figure 2:
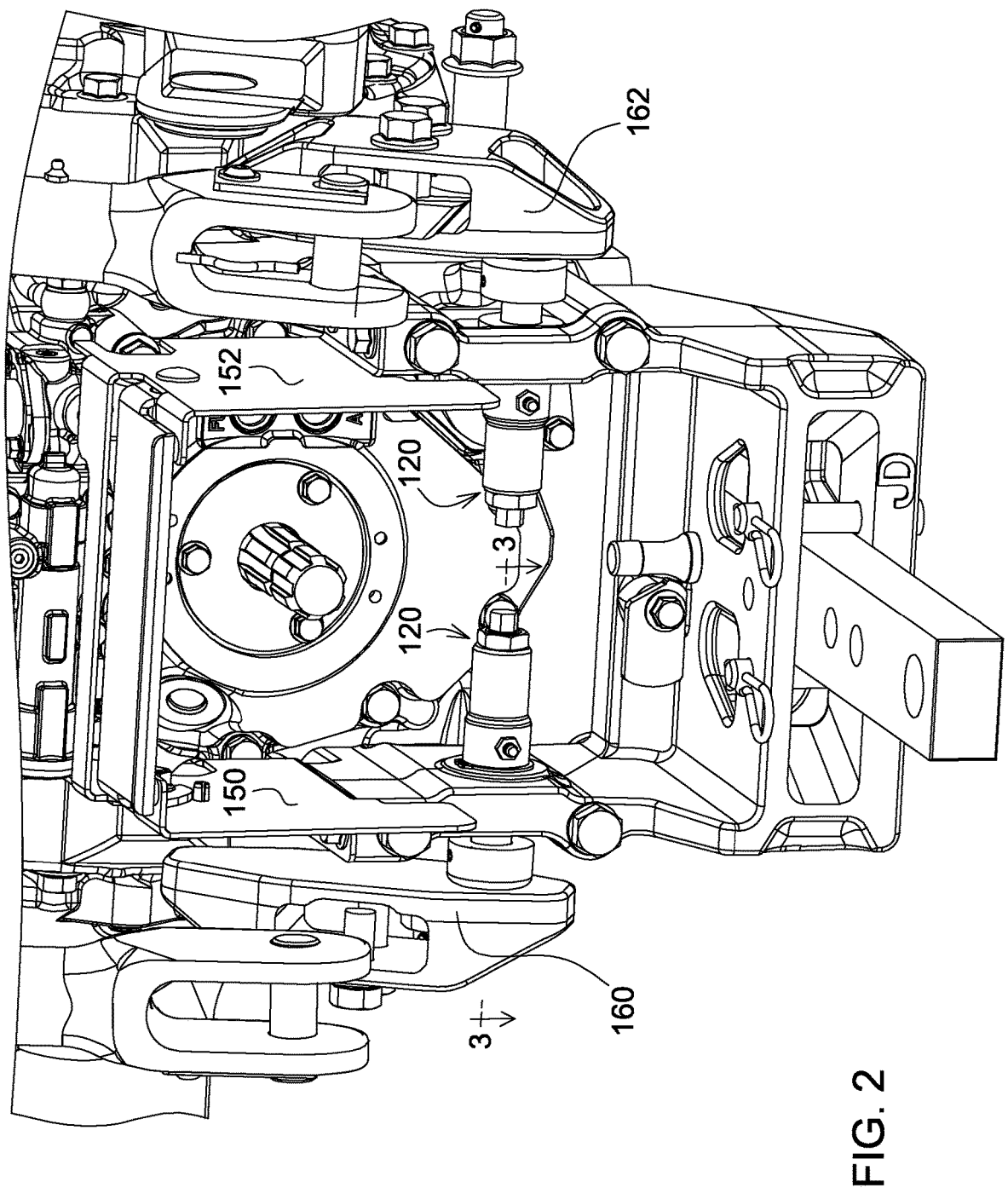
FIG. 2 is a rear view of a work vehicle including a sway adjustment apparatus, according to an implementation.

With reference to FIG. 2, the work vehicle 100 can include a sway adjustment apparatus 120 connected to a left frame member 150 or a right frame member 152. The sway adjustment apparatus 120 can engage with a left hitch linkage 160 or a right hitch linkage 162 to adjust the amount of movement or sway of the left hitch linkage 160 or the right hitch linkage 162. The sway adjustment apparatus 120 can extend outward to reduce the amount of movement or sway. The sway adjustment apparatus 120 can retract inward to increase the amount of movement or sway.

Figure 3:
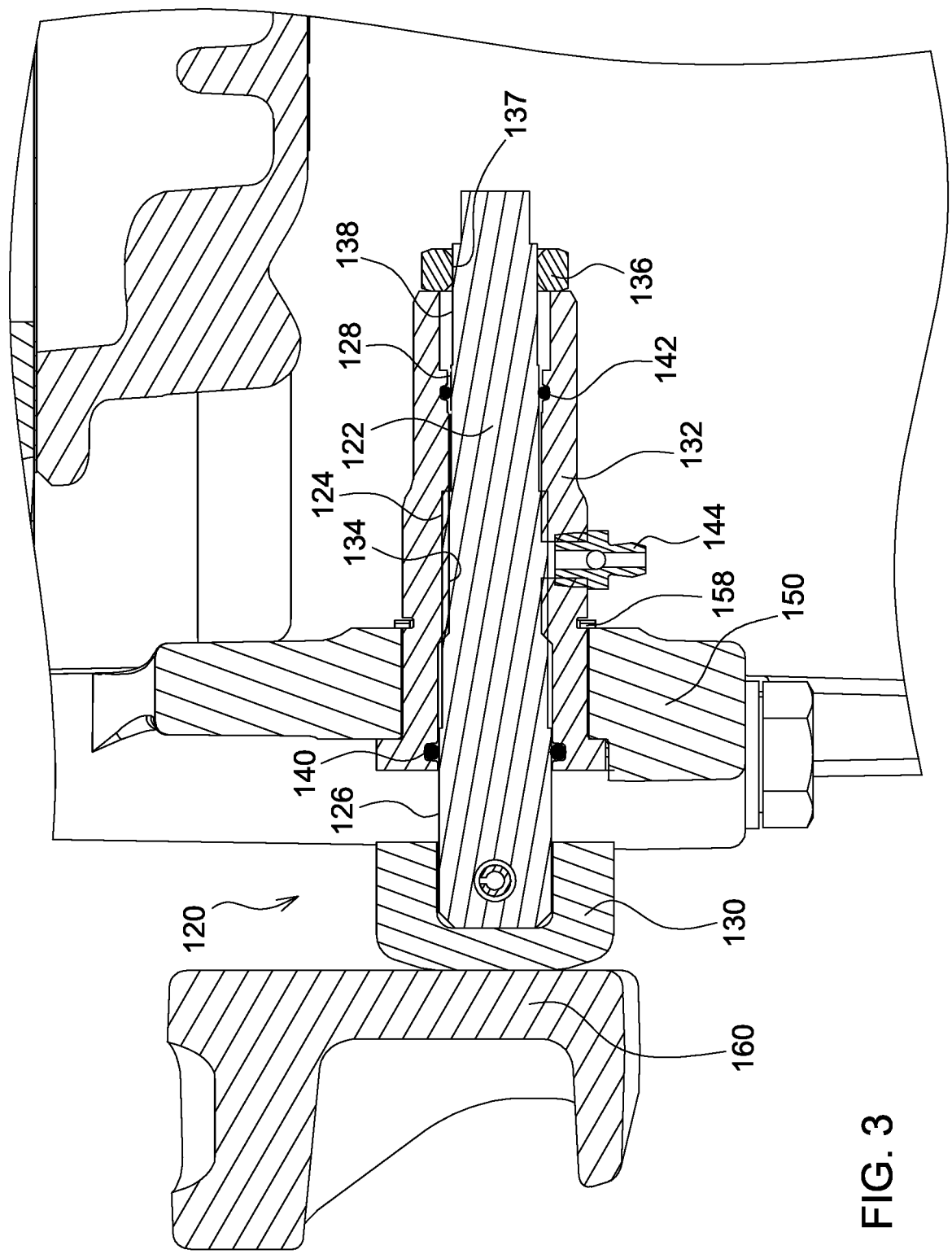
FIG. 3 is a cross sectional view of a sway adjustment apparatus, according to an implementation.
Figure 4:
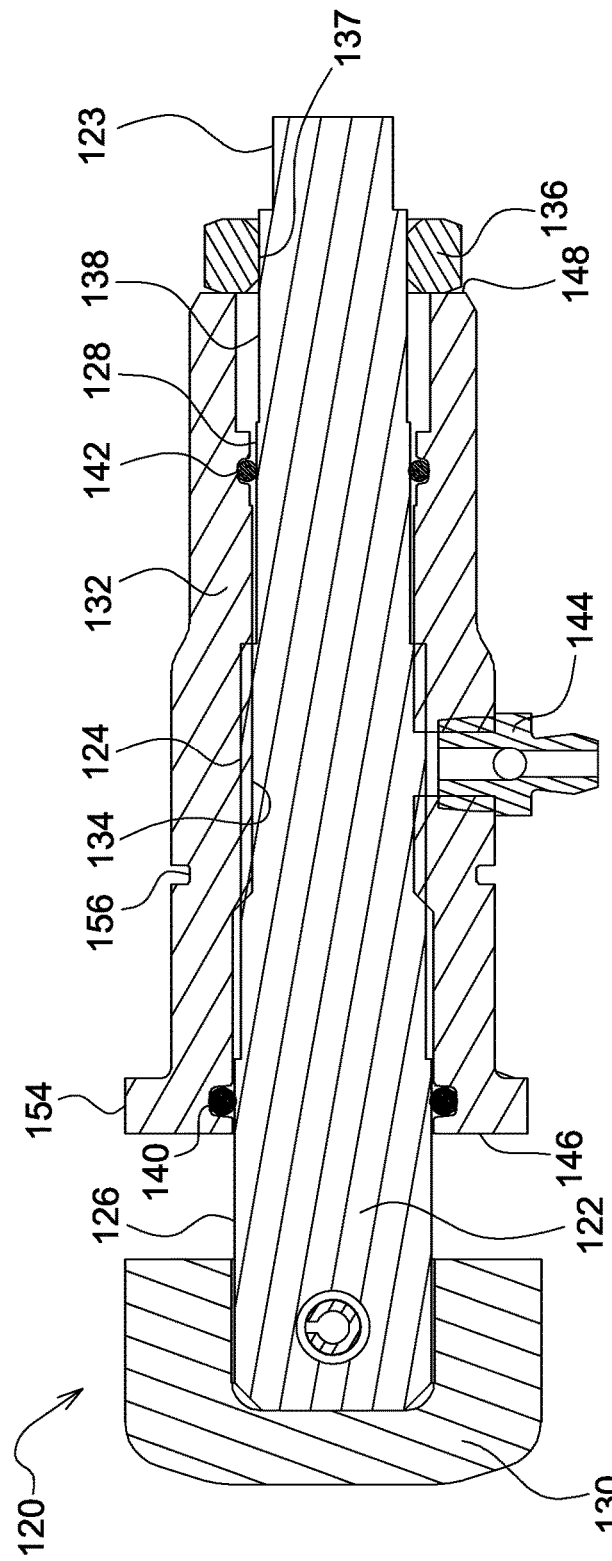
FIG. 4 is a cross sectional view of a sway adjustment apparatus in an extended position, according to an implementation.
Figure 5:
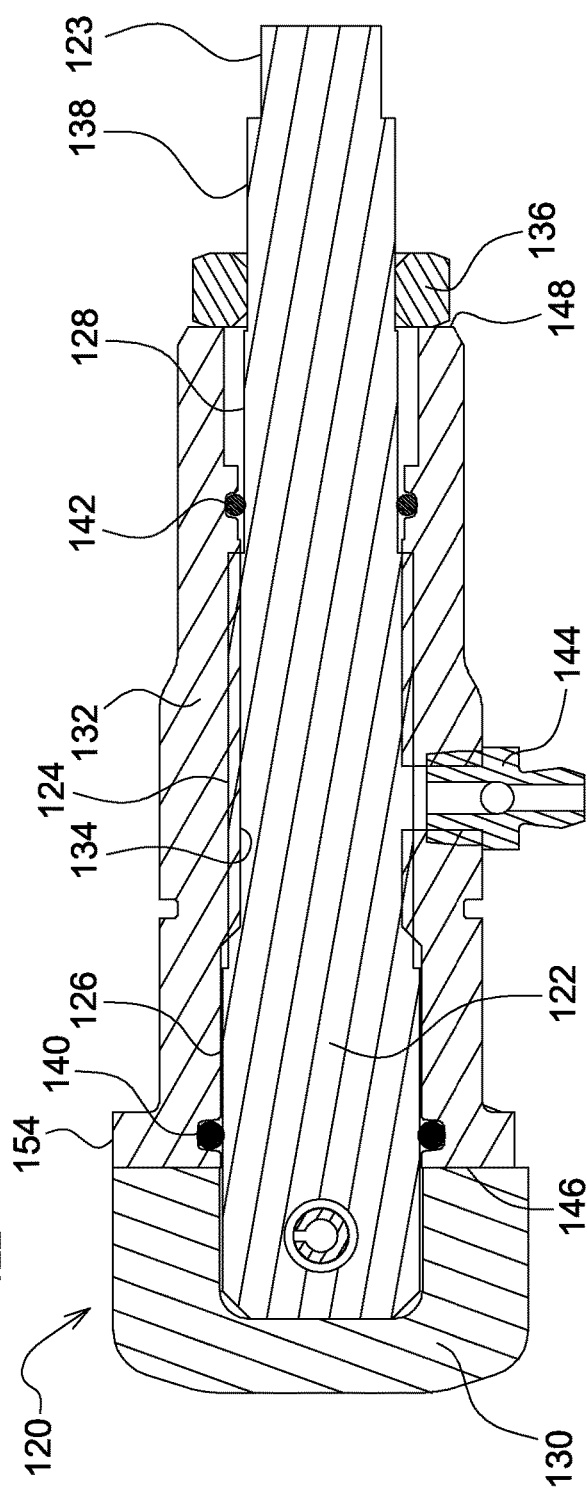
FIG. 5 is a cross sectional view of a sway adjustment apparatus in a retracted position, according to an implementation.

With reference to FIGS. 3-5, the sway adjustment apparatus 120 can include a casing 132 having internal threads 134 positioned between a first seal 140 on one side of the casing 132 and a second seal 140 on the other side of the casing 132. The first seal 140 can be positioned at or near a first end 146 of the casing 132, and the second seal 142 can be positioned at or near a second end 148 of the casing 132. The sway adjustment apparatus 120 can include a fastener 122 positioned within the casing 132. The fastener 122 can include a first set of external threads 124 dimensioned to interact or cooperate with the internal threads 134 of the casing 132. When the fastener 122 is rotated in either a first direction or a second direction, clockwise or counterclockwise, the fastener 122 moves left or right relative to the casing 132 depending upon the direction of rotation. The first seal 140 can be positioned between the interior surface of the casing 132 and the exterior surface of the fastener 122. The second seal 142 positioned between the interior surface of the casing 132 and the exterior surface of the fastener 122.

The fastener 122 can include a first surface 126 dimensioned to interact or cooperate with the first seal 140 and a second surface 128 dimensioned to interact or cooperate with the second seal 142. The first surface 126 can be level or uniform with a consistent circumference along its length. The second surface 128 can be level or uniform with a consistent circumference along its length. The interaction or cooperation between the first surface 126 and the first seal 140 and the interaction or cooperation between second surface 128 and the second seal 142 maintains lubricant between an outside or exterior surface of the fastener 122 and an inside or interior surface of the casing 132. The sway adjustment apparatus 120 can include a lubricant fitting 144 positioned within an orifice located between the first end 146 and the second end 148 of the casing 132. The lubricant fitting 144 allows lubricant to be added between the exterior surface of the fastener 122 and the interior surface of the casing 132.

The sway adjustment apparatus 120 can include a cover 130 positioned at a first end of the fastener 122. The cover 130 can be a separate piece or part connected to the fastener 122 or the cover 130 can be an integrated portion of the fastener 122, such as the head of a bolt. The cover 130 contacts the left hitch linkage 160 to limit or constrain the amount of movement or sway of the left hitch linkage 160. The cover 130 contacts the right hitch linkage 162 to limit or constrain the amount of movement or sway of the right hitch linkage 162. The cover 130 can also act as a stop to limit movement or travel of the fastener 122 when the sway adjustment apparatus 120 is retracted. The sway adjustment apparatus 120 can include an end member 136 connected to either the fastener 122 or the casing 132. The end member 136 can be secured to either the fastener 122 or the casing 132 after the sway adjustment apparatus 120 has been assembled. The end member 136 can have internal threads 137 which interact or cooperate with a second set of external threads 138 of the fastener 122, which are positioned on an opposite side of the second seal 142 as the first set of external threads 124. The end member 136 can also act as a stop to limit or prevent movement or travel of the fastener 122 after the sway adjustment apparatus 120 is adjusted. The end member 136 can be a standard hex nut with a lock washer, a lock nut with or without a washer, or any other type of locking fastener.

The fastener 122 can include an adjustment surface 123 positioned at a second end of the fastener 122. The adjustment surface 123 is used to rotate the fastener clockwise or counterclockwise when adjusting the fastener 122 relative to the casing 132. The adjustment surface 123 can include at least two planar surfaces. In some embodiments, the adjustment surface 123 can have a square or hexagon shape. The adjustment surface 132 can have a smaller circumference than the second set of external threads 138.

The fastener 122 can include various surfaces positioned next to each other. In some implementations, the fastener 122 includes an unthreaded first surface 126, which is positioned next to the first set of external threads 124, which are positioned next to an unthreaded second surface 128, which is positioned next to the second set of external threads 138. The various surfaces of the fastener 122 can have different circumferences. The various surfaces of the fastener 122 can be arranged in order of descending or ascending circumferences. The first surface 126 can have the largest circumference, the first set of external threads 124 can have a smaller circumference than the first surface 126, the second surface 128 can have a smaller circumference than the first set of external threads 124, and the second set of external threads 138 can have a smaller circumference than the second surface 128.

The casing 132 can include a lip or rim 154 with a larger circumference than the casing 132. The casing 132 can also include a groove or channel 156 in the exterior surface which receives a retaining device 158 such as a snap ring. The channel 156 is spaced apart a first distance from the rim 154. The first distance is dimensioned to a thickness of either the left frame member 150 or the right frame member 152. The left frame member 150 and the right frame member 152 can each include an aperture dimensioned to receive the casing 132. The rim 154 is larger than the aperture. When the casing 132 is inserted into the aperture in the left frame member 150 until the rim 154 contacts the left frame member 150. Then, a retaining device 158 is inserted into the channel 156 on the other side of the left frame member 150 securing the casing 132 within the left frame member 150.

The fastener 122 can be inserted into the casing 132 and rotated to at least partially thread the first set of external threads 124 into the internal threads 134 until the second set of external threads 138 extend through the casing 132. The first seal 140 contacts the first surface 126 and the second seal 142 contacts the second surface 128 creating a lubricant enclosure or reservoir between the first and second seals 140, 142 and between the exterior surface of the fastener 122 and the interior surface of the casing 132. The end member 136 can be threaded onto the second set of external threads 138 after the fastener 122 is inserted into the casing 132. The internal threads 137 of the end member 136 can be threaded onto the second set of external threads 138 of the fastener 122 until the end member 136 contacts or abuts the second end 148 of the casing 132. The end member 136 can be tightened against the casing 132 to maintain the fastener 122 in a position relative to the casing 132.

To adjust the fastener 122 relative to the casing, the end member 136 is loosened or moved away from the second end 148 of the casing 132 by rotating the end member 136 relative to the fastener 122. The fastener 122 is then rotated to either extend or retract the fastener 122 relative to the casing 132. Depending on the direction of rotation of the fastener 122 in either the first direction or the second direction, clockwise or counterclockwise, the fastener 122 extends or retracts. When the fastener 122 is in the desired position relative to the casing 132, the end member 136 is tightened or moved toward the second end 148 of the casing 132 by rotating the end member 136 relative to the fastener 122 until the end member 136 contacts or abuts the second end 148 of the casing 132. After the end member 136 is tightened against the second end 148 of the casing 132, the end member 136 maintains the fastener 122 in the desired position relative to the casing 132.

The cover 130 can limit the amount of retraction as depicted in FIG. 5, and the end member 136 can limit the amount of extension as depicted in FIG. 4. The first and second seals 140, 142 maintain lubricant in the first set of external threads 124 and the internal threads 134 positioned between the first and second seals 140, 142, which can prevent the first set of external threads 124 and the internal threads 134 from corroding.

Without in any way limiting the scope, interpretation, or application of the claims appearing below, a technical effect of one or more of the example implementations disclosed herein is a sway adjustment apparatus for a work vehicle. The sway adjustment apparatus can extend or retract to reduce or increase the amount of movement or sway of the hitch linkage. The sway adjustment apparatus is adjusted by rotating the fastener within the casing. The sway adjustment apparatus maintains lubricant in the threads between the fastener and the casing, which can prevent the threads from corroding.

The terminology used herein is for describing particular implementations and is not intended to be limiting of the disclosure. As used herein, the singular forms "a," "an," and "the" are intended to include the plural forms as well, unless the context clearly indicates otherwise. It will be further understood that the use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof. One or more of the steps or operations in any of the methods, processes, or systems discussed herein may be omitted, repeated, re-ordered, combined, or separated and are within the scope of the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A sway adjustment apparatus comprising:
   a casing including a first end and a second end, the casing including internal threads on an interior surface;
   a fastener positioned within an interior of the casing, the fastener including a first set of external threads on an exterior surface, the first set of external threads cooperating with the internal threads of the casing, the fastener rotates in a first direction to extend the fastener from the casing and rotates in a second direction to retract the fastener into the casing;
   a first seal positioned near the first end of the casing, the first seal positioned between the interior surface of the casing and the exterior surface of the fastener;
   a second seal positioned near the second end of the casing, the second seal positioned between the interior surface of the casing and the exterior surface of the fastener, the first and second seals forming a lubricant reservoir to maintain lubricant in the first set of external threads of the fastener and the internal threads of the casing;
   a cover positioned at a first end of the fastener; and
   an end member positioned at a second end of the fastener, the end member maintaining the position of the fastener within the casing;
   wherein the fastener includes a first surface positioned next to the first set of external threads, the first surface interacts with the first seal, and the first surface has a larger circumference than the first set of external threads.

2. The sway adjustment apparatus of claim 1, further comprising:
   a lubricant fitting positioned within an orifice located between the first and second ends of the casing, lubricant being added to the lubricant reservoir via the lubricant fitting.

3. The sway adjustment apparatus of claim 1, wherein the fastener includes a second set of external threads, the first set of external threads positioned between the first and second seals, and the second set of external threads positioned on an opposite side of the second seal.

4. The sway adjustment apparatus of claim 3, wherein the fastener includes a second surface positioned between the first set of threads and the second set of threads, and the second surface interacts with the second seal.

5. The sway adjustment apparatus of claim 4, wherein the first set of external threads has a larger circumference than the second surface.

6. The sway adjustment apparatus of claim 5, wherein the second surface has a larger circumference than the second set of external threads.

7. The sway adjustment apparatus of claim 1, wherein the casing includes a rim positioned at the first end and a channel spaced apart from the rim a first distance.

8. The sway adjustment apparatus of claim 1, wherein the cover limits an amount of retraction.

9. The sway adjustment apparatus of claim 1, wherein the end member limits an amount of extension.

10. A sway adjustment apparatus comprising:
    a casing including a first end and a second end, the casing including internal threads on an interior surface;
    a fastener positioned within an interior of the casing, the fastener including a first set of external threads and a second set of external threads on an exterior surface, the first set of external threads cooperating with the internal threads of the casing, the fastener rotating in a first direction to extend the fastener from the casing and rotating in a second direction to retract the fastener into the casing;
    a first seal positioned near the first end of the casing, the first seal positioned between the interior surface of the casing and the exterior surface of the fastener;
    a second seal positioned near the second end of the casing, the second seal positioned between the interior surface of the casing and the exterior surface of the fastener, the first and second seals forming a lubricant reservoir to maintain lubricant in the first set of external threads of the fastener and the internal threads of the casing;
    a cover positioned at a first end of the fastener; and
    an end member positioned at a second end of the fastener, the end member maintaining the position of the fastener within the casing;
    wherein the first set of external threads is positioned between the first and second seals, the second set of external threads is positioned on an opposite side of the second seal, and the first set of external threads has a larger circumference than the second set of external threads.

11. The sway adjustment apparatus of claim 10, wherein the fastener includes a first surface positioned next to the first set of external threads, and the first surface interacts with the first seal.

12. The sway adjustment apparatus of claim 11, wherein the fastener includes a second surface positioned between the first set of threads and the second set of threads, and the second surface interacts with the second seal.

13. The sway adjustment apparatus of claim 12, wherein the first surface has a larger circumference than the first set of external threads.

14. The sway adjustment apparatus of claim 13, wherein the first set of external threads has a larger circumference than the second surface.

15. The sway adjustment apparatus of claim 14, wherein the second surface has a larger circumference than the second set of external threads.

16. The sway adjustment apparatus of claim 10, wherein the casing includes a rim positioned at the first end and a channel spaced apart from the rim a first distance.

17. The sway adjustment apparatus of claim 10, further comprising:
    a lubricant fitting positioned within an orifice located between the first and second ends of the casing, lubricant being added to the lubricant reservoir via the lubricant fitting.

18. The sway adjustment apparatus of claim 10, wherein the cover limits an amount of retraction.

19. The sway adjustment apparatus of claim 10, wherein the end member limits an amount of extension.

20. A sway adjustment apparatus comprising:
    a casing including a first end and a second end, the casing including internal threads on an interior surface;
    a fastener positioned within an interior of the casing, the fastener including a first set of external threads, as second set of external threads, a first surface, and a second surface on an exterior surface, the first set of external threads cooperating with the internal threads of the casing, the fastener rotating in a first direction to extend the fastener from the casing and rotating in a second direction to retract the fastener into the casing;
    a first seal positioned near the first end of the casing, the first seal positioned between the interior surface of the casing and the exterior surface of the fastener;
    a second seal positioned near the second end of the casing, the second seal positioned between the interior surface of the casing and the exterior surface of the fastener, the first and second seals forming a lubricant reservoir to maintain lubricant in the first set of external threads of the fastener and the internal threads of the casing;
    a cover positioned at a first end of the fastener, the cover limiting an amount of retraction; and
    an end member positioned at a second end of the fastener, the end member maintaining the position of the fastener within the casing;
    wherein the first set of external threads is positioned between the first and second seals, and the second set of external threads is positioned on an opposite side of the second seal;
    wherein the first surface is positioned next to the first set of external threads, and the first surface interacts with the first seal;
    wherein the second surface is positioned between the first set of threads and the second set of threads, and the second surface interacts with the second seal; and
    wherein the first surface has a larger circumference than the first set of external threads, which has a larger circumference than the second surface, which has a larger circumference than the second set of external threads.

* * * * *